Patented June 30, 1936

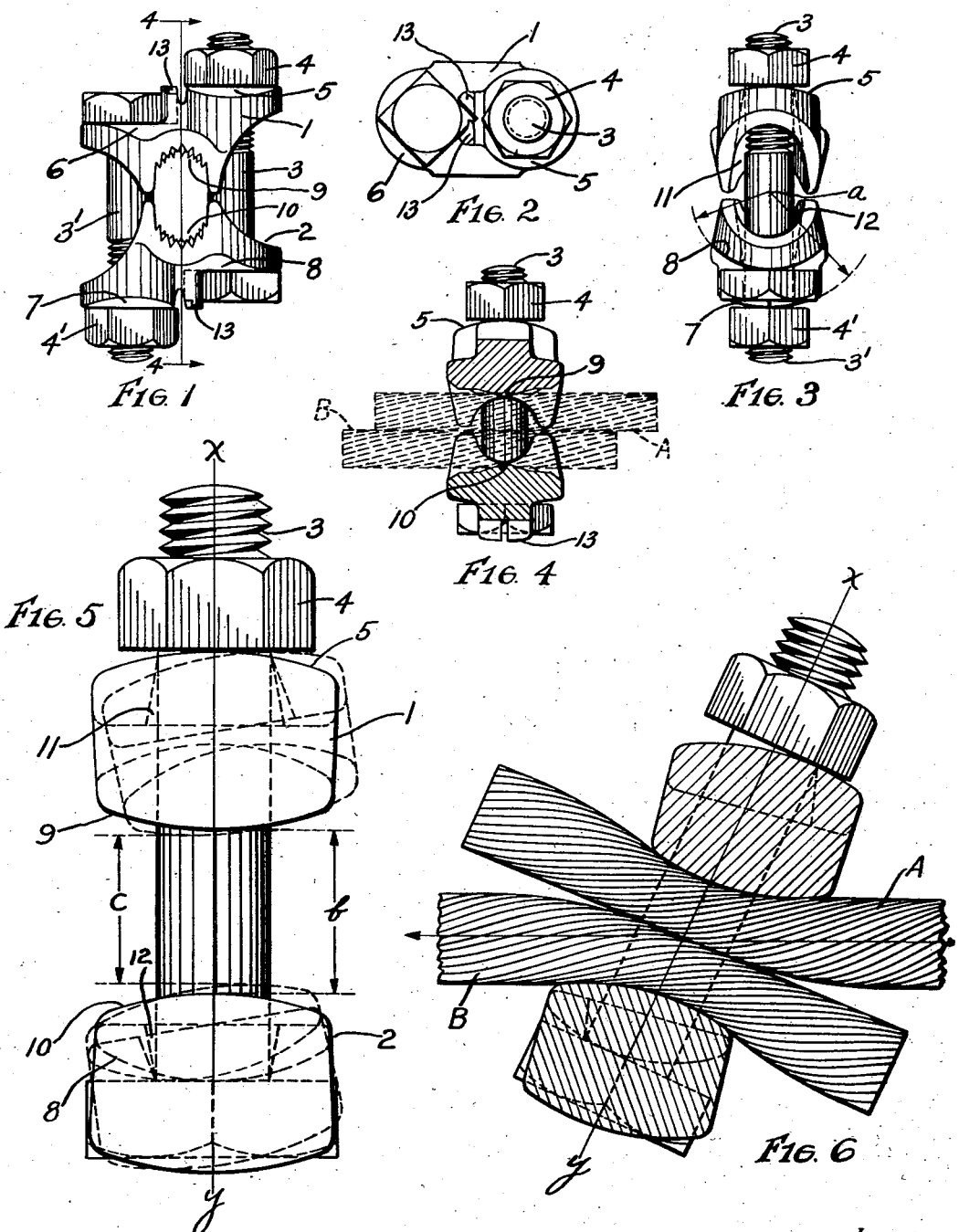

2,046,247

UNITED STATES PATENT OFFICE 2,046,247

CABLE CLIP

Homer P. Chandler, Mansfield, Ohio, assignor to The Ohio Brass Company, Mansfield, Ohio, a corporation of New Jersey Application September 1, 1934, Serial No. 742,455

7 Claims. (Cl. 24—115)

My invention relates to clamps for cables and wires and particularly where it is desired to unite two parallel cables with overlapping ends or to unite the end of a cable which has been bent back upon itself to form a loop.

Among the objects of my invention I have in mind to provide a simple, inexpensive clamp of high gripping power and in which the gripping power will increase with increased strain tending to move the cables relative to each other.

Another object of my invention is to provide a clamp which is compact and easy of manipulation in applying to the cable.

My invention resides in the new and novel construction, combination and relation of the parts hereinafter described and shown in the accompanying drawing.

In the drawing:—

Fig. 1 is a side view in elevation of my invention.

Fig. 2 is a top view.

Fig. 3 is an end view.

Fig. 4 is a longitudinal section on the line 4—4 of Fig. 1 with the addition of a pair of overlapped cable ends shown in dotted lines in position for clamping.

Fig. 5 is an enlarged schematic drawing for illustrating the relative movement of the elements of my invention.

Fig. 6 is a view merely illustrative of the relation which a simple clamping device will take to a pair of cables which have been placed under severe strain.

There are many forms of clamps upon the market for clamping two cables together under tension and which are particularly adapted for use with steel or iron cable but many of them are very inefficient in that they require a number of clamps at a single point to accomplish the desired object, while other clamps may require a less number of clamps to accomplish the same result.

My invention provides a single clamp which will accomplish the same results as several clamps of past construction acting in unison, thus reducing the cost of uniting the cables.

My invention is also automatic in operation, that is, as the strain is applied to the cables tending to move them apart the grip upon the same will be automatically increased through the use of cooperating cam surfaces in contact with the cables.

Many of the clamps upon the market have the nuts on the fastening bolts so close together that it is difficult for an operator to properly apply the clamps and in my construction I have avoided this objection.

In the preferred embodiment of my invention I employ two like clamping members 1 and 2. The members are held together by means of bolts 3 and 3' and nuts 4 and 4' respectively. The bolts are applied to the clamping members in reverse order.

The bearing surfaces on the clamps for the head of the bolts and the nuts are stepped. The clamping member 1 has the curved surface 5 and also the curved surface 6 which is depressed relative to the surface 5. The clamping member 2 has the curved surface 7 and also the curved surface 8 which is depressed relative to the surface 7.

It will be noted that the raised surface 5 coacts through the medium of the bolt 3 with the depressed surface 8 of the opposite clamp and that the raised surface 7 cooperates with the depressed surface 6 of the opposite clamp through the medium of the bolt 3'.

The curvature of the surfaces 7 and 8 are shown as having a common center $a$ (Fig. 3) and the same is true of the center of curvature for the surfaces 5 and 6. The curved surfaces permit the clamping members 1 and 2 to easily roll or rock relative to each other and with respect to the heads and nuts of the bolts 3 and 3' when stress is applied to the cables A and B clamped between the surfaces 9 and 10.

Referring to Fig. 5, the numerals applied thereto designate corresponding parts on the other figures of the drawing.

The relation of the clamping members 1 and 2 to the bolt 3 and nut 4 are shown in Fig. 5 in full lines and their relative position after being clamped to a pair of cables and stress placed upon the cables tending to separate them is represented by the dotted lines.

It will be noted that the distance between the clamping surfaces 9 and 10 when the members 1 and 2 have been initially clamped upon a cable is represented by the distance $b$. If stress is placed upon the cables as indicated by the arrows in Fig. 6 tending to withdraw the cables from the clamp then the members 1 and 2 will roll upon the head of the bolt 3 and the nut 4 and take the position shown by the dotted lines.

The curvature of the clamping surfaces 9 and 10 is such that the space between the clamping surfaces 9 and 10 will be reduced as the members 1 and 2 roll upon the bolt head and nut and after such movement the space is represented by $c$ which distance is less than the distance $b$.

The difference between the distance $b$ and $c$ can be made greater by increasing the radius of the curvatures 9 and 10 keeping the curvature of the surfaces 5 and 8 constant, but as the radius of the surfaces 9 and 10 is increased the increase in pressure upon the cables due to cam action is decreased. The pressure of the cam surface upon the cables as they tend to separate is increased as the difference between $b$ and $c$ is decreased.

The bolts 3 pass through openings 11 and 12 in the castings 1 and 2 respectively, the walls of which taper thus permitting the clamping members or roll or pivot with respect to the bolt heads and nuts.

I find that making the walls of the openings 11 and 12 with about a 10° taper each gives very good results, that is, sufficient movement of the parts, but this amount of course may be increased or decreased, thus effecting the amount of roll or rock of the clamping members relative to the bolts and nuts.

When the members 1 and 2 have rolled upon the bolt heads and nuts a sufficient amount to take up the full 10° or other spacing in the openings 11 and 12, then any increased strain upon the cables tending to pull them apart will have a tendency to cause the axis $x$—$y$ to assume an oblique position to the direction of strain placed upon the cables as shown in Fig. 6 and this will have a tendency also to further increase the gripping effect upon the cables. I find that the tendency for the bolt to assume an oblique angle is greater when a single clamp is used and decreases as additional clamps are used.

The curvature of the faces 5, 6, 7 and 8 may be the same or may differ, and also the angle of the openings 11 and 12 and likewise the radius of the clamping surfaces 9 and 10 may be varied to vary the clamping effect upon the cables under stress.

It will be noted that the nuts 4 and 4' are positioned well above and below respectively of the adjacent bolt heads (Fig. 1) and this is a decided benefit in that it permits the convenient application of a wrench to the nuts 4 and 4' in applying the clamp to the cables. If both nuts were adjacent and on the same plane it will be appreciated that difficulty would be had in properly tightening the nuts unless the bolts were spread a considerable distance apart but with the nuts and bolts arranged as described and shown the inner surface of the bolts can be brought into very close or contact relation to the cables, thus making a clamp which has a high degree of permanent grip upon the cables as there will be a small amount of yield in the parts of each clamping member due to compactness for a given amount of metal.

I also find that it is a convenience to have one of the bolts permanently attached to one of the clamping members and, therefore, I provide lugs 13 which form a V groove to receive the corner of the bolt head and these lugs project above the head of the bolt and before leaving the factory the projecting portion may be bent over thus securing one of the bolts permanently to one of the clamping members. The lugs 13 are not bent over to such a degree as to prevent the free rolling movement of the clamping member relative to the bolt.

Modifications will suggest themselves to those skilled in the art after my disclosure and, therefore, I wish to be limited only by my claims.

I claim:—

1. A cable clamp to grip a pair of cables comprising a pair of oppositely disposed like members, each member having a cable-receiving groove to receive one of the cables, each groove being convexed relative to the longitudinal axis of the cables, each member having stepped portions with curved seating surfaces, an opening intersecting each curved seating surface, a pair of bolts with nuts mounted in the openings and extending through the openings to draw the members into clamping engagement with the cables, the openings being of greater diameter than that of the bolts to permit relative rocking of the bolts and members, each bolt extending through an opening in each member with the bolt head and nut engaging the said curved seating surface of opposite members permitting the members to rock relative to each other and to the cables and bolts when stress is applied to the cables tending to withdraw them from the clamp.

2. A cable clip to clamp a pair of cables together comprising a pair of counterpart clamping members, each member comprising a body having a groove convexed relative to the longitudinal axis of the cable to receive one of the cables and a headed clamping bolt mounted in and projecting through an over-size opening in the body and means on the body engaging the bolt head to hold the bolt loosely in position with the head in position to engage a portion of the body adjacent the opening, a second opening in each body through which the projecting portion of the bolt of the opposite clamping member extends, an adjustable nut on the free end of each bolt to engage a portion of the opposite body, the bolts and nuts adapted to draw the clamping members into clamping engagement with the cables, the portion of the bodies engaged by the bolt heads and nuts being convex to form curved seats to permit the clamping members to rock relative to the clamping bolts and nuts and to each other and to the cables when the cables are stressed in opposite directions.

3. A cable clip to clamp a pair of cables together comprising a pair of like clamping members, each member comprising a body having a groove to receive a cable and the surface of the groove convex relative to the longitudinal axis of the cable and a headed clamping bolt projecting through an opening in the body and means to hold the bolt loosely in position with the head in position to engage with a curved portion of the body and a second opening in the body through which the projection portion of the bolt on the opposite clamping member extends, the openings having a clearance relative to the bolts to allow a rocking movement of the members relative to the bolts, an adjustable nut on the free end of each bolt in position to engage a curved portion of the body of the opposite member, the bolts and nuts adapted to draw the members into clamping engagement with the cables, the said body portions engaged by the bolts and nuts forming convexed seats to permit the body members to rock relative to the clamping bolt and nut and to each other and to the cables, the portions of the bodies engaged by the bolt heads being positioned nearer the cable than the said portion of the same body which is engaged by the nut of the bolt on the opposite body.

4. A cable clip to clamp a pair of cables together comprising a pair of clamping members, each member comprising a body having a groove to receive a cable and the surface of the groove convex relative to the longitudinal axis of the cable and a separately formed headed clamping bolt projecting loosely through an opening in the body and means to hold the bolt against turning with the head in contact with the body, each body provided with a second opening through which the projecting portion of the bolt on the opposite clamping member extends, an adjustable nut on the free end of each bolt to engage with the body of the cooperating member, the bolts and nuts adapted to draw the members into clamping engagement with the cables, the said portions of the body engaged by the bolt heads and nuts being convexed to permit the clamping members to rock relative to the clamping bolts and nuts and to each other and to the cables.

5. A cable clip to clamp a pair of cables together comprising a pair of clamping members to receive a pair of cables, each member comprising a body having a groove to receive one of the cables and a headed clamping bolt projecting through an opening in the body with the head in position to engage with the body and clearance between the body and bolt, a second opening through each body through which the bolt on the cooperating clamping member extends, an adjustable nut on the free end of each bolt to engage with the body of the opposite clamping member, the surfaces of the bodies engaged by the bolt heads and nuts being convex to permit the body members to pivot relative to the bolts and cables, the surface of the aforesaid groove being curved convexly relative to the longitudinal axis of the cables to provide a rocking cam action of each clamping member relative to the cables to increase the clamping pressure thereon as the strain upon the cables to separate them increases.

6. A cable clip to clamp a pair of cables together comprising a pair of clamping members, each member provided with a body having a pair of spaced openings and a cable engaging seat curved convexly relative to the cable to permit both clamping members to rock relative to the cables in the plane of the cables and to each other, a bolt positioned loosely in one opening of each body and projecting through the other opening of the cooperating clamping member, means to hold the bolt loosely but against longitudinal displacement, the surfaces adjacent the openings being convex and the plane of the surfaces adjacent the opening in which the bolt is secured being depressed relative to the plane of the surface of the other opening, a nut threaded on each bolt to engage the surface adjacent the opening on the cooperating clamping member through which the bolt projects, the nuts and bolts arranged to draw the bodies into clamping engagement with the cables, the clamping engagement of the members upon the cables increasing as the stress upon the cables increases and the body members rock upon the cables relative thereto and to each other.

7. A clamping member to grip a pair of cables comprising a body having a cable-receiving groove to receive one of the cables, the groove being convexed relative to the longitudinal axis of the cable, stepped portions with curved seating surfaces, an opening intersecting each curved seating surface, a bolt mounted in one of the openings, the opening for the bolt being of greater diameter than that of the bolt to permit the bolt to rock relative to the body member, bent-over means to limit longitudinal movement of the bolt in one direction relative to the body member, and a nut on the bolt arranged to draw the body member and a cooperating clamping member into clamping engagement with the cables and permit the members to rock relative to each other and to the cables when stress is applied to the cables in opposite directions tending to draw them apart.

HOMER P. CHANDLER.